(12) United States Patent
Luis (10) Patent No.: US 12,428,859 B2
(45) Date of Patent: Sep. 30, 2025

(54) BLOWING MACHINE

(71) Applicant: SAINT-GOBAIN ISOVER, Courbevoie (FR)

(72) Inventor: David Luis, Rantigny (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 584 days.

(21) Appl. No.: 17/873,523

(22) Filed: Jul. 26, 2022

(65) Prior Publication Data

US 2023/0021689 A1    Jan. 26, 2023

(30) Foreign Application Priority Data

Jul. 26, 2021  (FR) ........................................ 2108065

(51) Int. Cl.
*B65G 53/14* (2006.01)
*E04F 21/08* (2006.01)
*E04F 21/12* (2006.01)

(52) U.S. Cl.
CPC ............ *E04F 21/12* (2013.01); *E04F 21/085* (2013.01)

(58) Field of Classification Search
None
See application file for complete search history.

(56) References Cited

U.S. PATENT DOCUMENTS

| | | | | |
|---|---|---|---|---|
| 3,746,254 A | * | 7/1973 | Duncan | B05B 5/032 239/697 |
| 4,231,202 A | * | 11/1980 | Dube | E04C 2/54 126/621 |
| 4,367,989 A | * | 1/1983 | Smith | B65G 53/14 37/321 |
| 4,538,941 A | * | 9/1985 | Thorne | B65G 53/42 406/143 |
| 5,145,293 A | * | 9/1992 | Savino | B05B 7/1463 406/122 |

(Continued)

FOREIGN PATENT DOCUMENTS

| | | |
|---|---|---|
| BE | 704 808 A | 2/1968 |
| DE | 295 01 353 U1 | 3/1995 |

(Continued)

OTHER PUBLICATIONS

Search Report as issued in French Patent Application No. FR2108065, dated Apr. 1, 2022.

(Continued)

*Primary Examiner* — Joseph A Dillon, Jr.
(74) *Attorney, Agent, or Firm* — Pillsbury Winthrop Shaw Pittman LLP (57) ABSTRACT

A machine for blowing a loose-fill insulating product, includes at least a base and a pipe for transporting the insulating product, the base including at least an air inlet, an inlet for loose-fill insulating product and an outlet connected to the pipe, the pipe including at least one cylindrical wall which delimits a space configured for the passage of the loose-fill insulating product and the air, the blowing machine including at least one evacuation orifice formed through the cylindrical wall of the pipe, the at least one evacuation orifice being configured to allow the passage of air toward the exterior of the pipe and block the passage of the loose-fill insulating product.

14 Claims, 6 Drawing Sheets

(56) References Cited

U.S. PATENT DOCUMENTS

| | | | | |
|---|---|---|---|---|
| 5,195,852 | A * | 3/1993 | Malugani | B65G 53/42 |
| | | | | 406/41 |
| 5,590,984 | A * | 1/1997 | Assarsson | E04F 21/12 |
| | | | | 406/122 |
| 6,254,315 | B1 * | 7/2001 | Pfeiffer | B65G 53/14 |
| | | | | 406/117 |
| 6,503,026 | B1 | 1/2003 | Mitchell | |
| 6,821,060 | B2 * | 11/2004 | McTurk | B01F 23/59 |
| | | | | 406/137 |
| 7,080,961 | B1 * | 7/2006 | Blatt | A01C 15/04 |
| | | | | 406/122 |
| 7,300,521 | B2 * | 11/2007 | Bowman | E04F 21/12 |
| | | | | 406/48 |
| 7,635,011 | B2 * | 12/2009 | Harris | B01J 8/004 |
| | | | | 141/93 |
| 7,798,167 | B2 * | 9/2010 | Ohmi | G05D 16/208 |
| | | | | 137/601.01 |
| 7,845,585 | B2 * | 12/2010 | Evans | E04F 21/085 |
| | | | | 241/60 |
| 9,174,812 | B2 * | 11/2015 | Harris | B65G 53/60 |
| 9,950,876 | B2 * | 4/2018 | Roberge | B65G 53/42 |
| 10,226,917 | B2 * | 3/2019 | Hyatt | B33Y 40/00 |
| 10,407,256 | B2 * | 9/2019 | Roberge | B65G 53/42 |
| 11,092,373 | B2 * | 8/2021 | Handfield | B65G 53/14 |
| 11,174,111 | B2 * | 11/2021 | Walker | B65G 53/24 |
| 11,952,224 | B2 * | 4/2024 | Handfield | F25C 5/20 |
| 12,116,221 | B2 * | 10/2024 | Jokela | B65G 53/4675 |
| 2006/0013659 | A1 * | 1/2006 | Pfeiffer | B65G 53/521 |
| | | | | 406/182 |
| 2006/0163763 | A1 | 7/2006 | Fellinger | |
| 2007/0014641 | A1 * | 1/2007 | Fellinger | E04F 21/12 |
| | | | | 406/46 |
| 2010/0310798 | A1 * | 12/2010 | Lasalle | E04B 1/7604 |
| | | | | 428/34.1 |
| 2015/0110565 | A1 * | 4/2015 | Harris | B65G 69/182 |
| | | | | 406/144 |
| 2023/0021580 | A1 * | 1/2023 | Luis | E04F 21/12 |
| 2024/0209641 | A1 * | 6/2024 | Luis | E04F 21/085 |

FOREIGN PATENT DOCUMENTS

| | | |
|---|---|---|
| DE | 299 03 378 U1 | 7/1999 |
| EP | 1 028 208 A2 | 8/2000 |
| EP | 2 657 431 A1 | 10/2013 |
| JP | 02018222 A * | 1/1990 |

OTHER PUBLICATIONS

Communication under Article 94(3) CBE issued in European Patent Application No. 22186317.8, dated Dec. 12, 2024.

* cited by examiner

BLOWING MACHINE

CROSS-REFERENCE TO RELATED APPLICATIONS

This application claims priority to French Patent Application No. 2108065, filed Jul. 26, 2021, the entire content of which is incorporated herein by reference in its entirety.

FIELD

The present invention relates to a machine for blowing a loose-fill insulating product, such as glass wool, rock wool, cellulose wadding, cotton fibers or any other similar materials, the blowing machine comprising a pipe for spraying said loose-fill insulating product.

BACKGROUND

It is commonplace to use loose-fill insulating products to insulate a dwelling, and more particularly to insulate roof spaces of such a dwelling. The use of a blowing machine thus makes it easier to spray the insulating product in the dwelling, by blowing the insulating product using pressurized air at a high flow rate. More specifically, the insulating product is sprayed by means of a pipe, which is fluidically connected to a base of the blowing machine within which the air and said loose-fill insulating product are mixed. The pressure and the flow rate of the air in the pipe then need to be high enough for it to be possible to transport the insulating product from the base of the blowing machine to an outlet of the pipe.

This need for a high air pressure to carry out the spraying of insulating product needs, however, to be offset by the drawbacks that too powerful spraying of insulating products may bring about, these including, non-exhaustively, the raising of dust when the loose-fill insulating product is sprayed in dwelling roof spaces and/or the excessive compacting of the loose-fill insulating product, which can bring about less effective insulation.

SUMMARY

An aspect of the present invention is to remedy the abovementioned drawbacks by providing simple, maneuverable means that are applicable to existing blowing machines, making it possible in particular to improve the quality, an in particular the uniformity, of the loose-fill insulating product sprayed in the zone to be insulated of the dwelling.

In this context, an aspect of the invention relates to a machine for blowing a loose-fill insulating product, comprising at least a base and a pipe for transporting the insulating product, the base comprising at least an air inlet, an inlet for loose-fill insulating product and an outlet connected to the pipe, the pipe comprising at least one cylindrical wall configured for the passage of the loose-fill insulating product and the air between a first opening formed at a first end of the pipe, secured to the outlet of the base, and a second opening formed at a second end of the pipe, at the opposite end from its first end along a longitudinal main elongation direction of the pipe, the blowing machine having at least one evacuation orifice, separate from the first opening and the second opening, formed through the cylindrical wall of the pipe, the at least one evacuation orifice being configured to allow the passage of air toward the exterior of the pipe and block the passage of the loose-fill insulating product.

The blowing machine can be used to spray the loose-fill insulating product, for example glass wool, in a zone to be insulated of a dwelling, for example roof spaces. More specifically, the pipe of the blowing machine makes it possible to spray a mixture made of pressurized air and loose-fill insulating product in the zone to be insulated, the mixture being created in the base of the blowing machine. More specifically, the pressurized air in the pipe makes it possible to direct the loose-fill insulating product from the first opening of the pipe at least as far as the second opening forming the outlet of the pipe, in the direction of the zone to be insulated of the dwelling, and the second opening is configured to allow the air and the loose-fill insulating product to pass to the exterior.

The at least one evacuation orifice then allows air to pass from the space of the pipe to the exterior of said pipe in order to reduce the pressure and the flow rate of air in the pipe and thus to adjust the outlet flow rate of the mixture without otherwise modifying the flow rate of air in the base of the blowing machine. To this end, the at least one evacuation orifice is configured to open both onto the interior of the pipe and onto the exterior of the pipe. Reducing the outlet flow rate makes it possible in particular to avoid the raising of dust that may be present in the zone to be insulated, and/or to prevent the sprayed loose-fill insulating product from being excessively compacted in the final insulation, under the effect of too high a pressure of the air sprayed simultaneously with the loose-fill insulating product, and the invention makes it possible to achieve these benefits without reducing the flow rate of air at the inlet of the blowing machine, which would have the effect of causing the loose-fill insulating product to circulate within the pipe at too low a speed to be sprayed correctly at the pipe end.

According to one feature of the invention, the pipe comprises at least one shutoff device for the at least one evacuation orifice, the shutoff device being movable along the longitudinal direction of the pipe.

It will be understood that the shutoff device is movable between a position covering the evacuation orifice, in which it makes it possible to block the passage of air through the evacuation orifice, and a clearing position, in which the air can exit the pipe through the evacuation orifice. The movement of the shutoff device makes it possible to control the pressure and the flow rate of the air depending on the desired flow rate of the mixture of air and insulating product exiting the pipe, at its second opening. The shutoff device may be, for example, a sleeve that is able to slide longitudinally about the cylindrical wall of the pipe.

According to one feature of the invention, the evacuation orifice has a passage cross section smaller than or equal to 5 mm.

It will be understood that such a dimension of the passage cross section of the evacuation orifice, for example the diameter of the evacuation orifice when the latter has a circular shape, makes it possible to limit the passage of loose-fill insulating product through said evacuation orifice, most of the fibres of insulating product having a size larger than 5 mm. Such dimensioning of the evacuation orifice thus forms a system for blocking the insulating product, which furthermore allows the pressurized air to pass toward the exterior of the pipe.

According to one feature of the invention, a filtration device is disposed so as to cover the at least one evacuation orifice.

The filtration device helps to limit the passage of insulating product through the evacuation orifice while allowing the passage of air through the pipe. Such a filtration device can be disposed so as to cover an evacuation orifice of which the passage cross section is smaller than or equal to 5 mm in order to reinforce the effect of blocking the passage of insulating product through said evacuation orifice.

According to one feature of the invention, the filtration device is a grating disposed against the cylindrical wall. The grating may in particular comprise a plurality of holes having passage cross sections smaller than or equal to 5 mm. Beneficially, the filtration device is made from a flexible material such that the grating can conform to the shape of the cylindrical wall of the pipe.

According to one feature of the invention, the filtration device is disposed in a space delimited within the cylindrical wall. In other words, the filtration device is pressed against the internal face of the cylindrical wall. In such a disposition, the filtration device does not block the sliding of the shutoff device along the cylindrical wall of the pipe.

According to an example of the invention, the filtration device extends along an entire longitudinal dimension of the pipe. In other words, the filtration device extends all along the cylindrical wall delimiting the pipe and in particular all along the internal face of the cylindrical wall. Furthermore, the filtration device may be disposed in the space of the pipe such that a spacing is left between said filtration device and the cylindrical wall, the spacing being able to have a dimension of between 2 mm and 4 mm measured along a straight line perpendicular to the longitudinal direction of the pipe. Benefit is taken of such a feature of the filtration device in that it makes it easier to insert the latter into and hold it in the space of the pipe.

According to one feature of the invention, the at least one evacuation orifice extends in the cylindrical wall along an axis of elongation perpendicular to the longitudinal direction of the pipe.

In other words, the evacuation orifice is a straight orifice, meaning that it is defined by a cylindrical shape about an axis of revolution which is substantially perpendicular to the direction of circulation of the air and of the loose-fill insulating product within the duct delimited by the cylindrical wall of the pipe.

According to an alternative of the invention, the at least one evacuation orifice extends in the cylindrical wall along an axis of elongation that is inclined with respect to the longitudinal direction of the pipe. More particularly, the evacuation orifice is inclined such that it extends from the interior to the exterior of the pipe in the direction of the first end of the pipe.

In other words, in this alternative, the evacuation orifice is inclined in the cylindrical wall such that the air passing through it circulates in a direction substantially opposite to the direction of circulation of the mixture of air and insulating product in the space of the pipe. Such an inclination makes it possible to limit the passage of the loose-fill insulating product through the evacuation orifice.

According to one feature of the invention, the at least one evacuation orifice is closer to the second end of the pipe than to the first end. Such a disposition of the evacuation orifice on the pipe makes it possible to maintain a sufficient air flow rate and pressure in the space delimited by the cylindrical wall in order to spray the mixture out of the pipe through the second opening, a part of the air only being evacuated on approaching said second end.

According to one feature of the invention, the blowing machine comprises a plurality of evacuation orifices, the evacuation orifices being grouped together in a section of the pipe that is able to be completely shut off by the shutoff device.

According to one feature of the invention, the base comprises an air circulation channel and a circulation channel for the loose-fill insulating product which are respectively connected to the air inlet and to the inlet for the loose-fill insulating product, the air circulation channel and the circulation channel for the loose-fill insulating product being fluidically connected to the first opening of the pipe. It will be understood that each of the loose-fill insulating product and the air is supplied separately into the base of the blowing machine before a mixture circulating in the pipe is formed. A ventilation device can thus be positioned in the air circulation channel in order to make the air circulate under pressure and at a high flow rate in the air circulation channel and inside the pipe.

According to one feature of the invention, a member for controlling the flow rate is positioned between the circulation channels and the first opening of the pipe.

The member for controlling the flow rate makes it possible in particular to adjust the flow rate of the mixture of air and insulating product upstream of its inlet into the pipe through the first opening in the latter.

An aspect of the invention also relates to a method for insulating a zone to be insulated, for example the roof spaces of a building, wherein a loose-fill insulating product is blown by a blowing machine according to any one of the preceding features.

The loose-fill insulating product may be, by way of nonlimiting example, mineral wool such as glass wool or rock wool. Preferably, the loose-fill insulating product is glass wool.

According to one feature of the method of the invention, the base of the blowing machine is supplied with air in a first step, via the air inlet and at a given flow rate, the air being mixed with the loose-fill insulating product during subsequent steps in order for them to circulate together in the pipe in the direction of the second opening thereof, the user being able to configure the air evacuation opening to evacuate a given quantity of air between the base and the second opening.

BRIEF DESCRIPTION OF THE DRAWINGS

Further features, details and benefits of the invention will become more clearly apparent from reading the description given below by way of indication, with reference to the drawings, in which.

DETAILED DESCRIPTION

It should first of all be noted that, while the figures set out the invention in detail for implementing the invention, it will be appreciated that these figures may be used to better define the invention, if necessary. It should also be noted that these figures only set out exemplary embodiments of the invention. Lastly, the same references denote the same elements throughout the figures.

Figure 1:
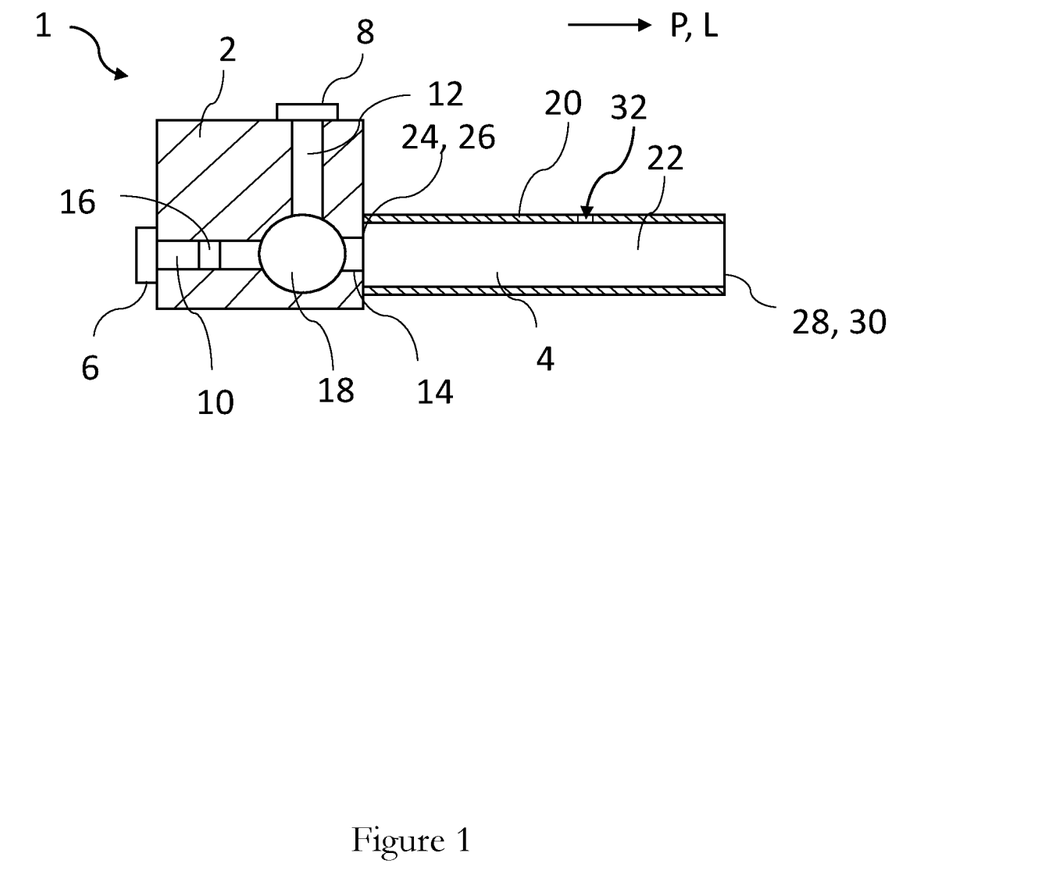
FIG. 1 is a schematic cross-sectional view of a blowing machine according to an aspect of the invention, comprising at least a base and a pipe comprising at least one evacuation orifice.

FIG. 1 illustrates a machine 1 for blowing a loose-fill insulating product according to an aspect of the invention, comprising at least a base 2 and a pipe 4 for the transport of the insulating product. The base 2 comprises in particular at least an air inlet 6 and an inlet 8 for insulating product that are separate from one another, the inlet 8 for insulating product being connected to a reservoir of loose-fill insulating product that is disposed outside the blowing machine 1 and cannot be seen here. An air circulation channel 10 and a circulation channel 12 for the insulating product each extend in the base 2 of the blowing machine 1, from the air inlet 6 and the inlet 8 for insulating product, respectively, and are connected to an outlet 14 of the base 2 connected to the pipe 4.

In order to allow the circulation of the air at a high flow rate in the air circulation channel 10, the latter may, according to an example of the invention, comprise a ventilation device 16 ensuring the circulation of the air from the air inlet 6 and at least as far as the outlet 14 of the base 2. Still according to the example of the invention in FIG. 1, a member 18 for controlling the flow rate is disposed between the air circulation channel 10, the circulation channel 12 for the insulating product and the outlet 14 of the base 2 and this member for controlling the flow rate may be configured by the user so as to mix the air and the insulating product in given proportions and to modify the quality of the insulation that can be obtained by the spraying of the loose-fill insulating product in the pipe 4.

The pipe 4 comprises a cylindrical wall 20 which delimits a space 22 configured for the passage of the insulating product and the air. The space 22 extends between a first opening 24 formed at a first end 26 of the pipe 4, which is secured to the outlet 14 of the base 2, and a second opening 28 formed at a second end 30 of the pipe 4, at the opposite end from the first end 26 along a main elongation direction P of the pipe 4, which in this case is longitudinal L.

The air circulation channel 10 and the circulation channel 12 for the insulating product are fluidically connected to the first opening 24 of the pipe 4, in order to allow the combined presence of air and insulating product in the pipe, and the second opening 28 of the pipe 4 forms an outlet end for letting the mixture of air and loose-fill insulating product out of the blowing machine 1.

The ventilation device 16 present in the air circulation channel 10 is configured and designed to push the mixture formed of the air and insulating product, under pressure, at least as far as the second opening 28 of the pipe 4, so as to make it easier to spray the mixture in a zone to be insulated of the dwelling.

According to an example of the invention, the pipe 4 has a dimension D, measured along the longitudinal direction L, of between 10 m and 20 m. To obtain a blowing machine with a greater longitudinal dimension, it is then possible to dispose several pipes 4 one after another. Furthermore, a diameter of the pipe 4 may be between 50 mm and 120 mm according to an embodiment of the invention. The pipe 4 may be made for example of a plastics material. It should be noted that these values of the dimension and diameter are given by way of examples and are not limiting, it being possible for a pipe according to one or more embodiments of the invention to have a dimension and a diameter with values smaller or greater than the values mentioned.

According to an embodiment the invention, the blowing machine 1 comprises at least one evacuation orifice 32, separate from the first opening 24 and from the second opening 28, formed through the cylindrical wall 20 of the pipe 4. More specifically, the evacuation orifice 32 forms a passage between the internal space 22 of the pipe 4, where the mixture of air and insulating product circulates, and an exterior environment of the blowing machine 1. In other words, a part of the flow circulating within the pipe is able to escape from the pipe through the evacuation orifice.

The evacuation orifice 32 is configured to allow the passage of air toward the exterior of the pipe 4, while blocking the passage of the loose-fill insulating product toward the exterior of said pipe 4. In other words, the evacuation orifice 32 allows the evacuation of a part of the air circulating in the space 22 within the pipe while channeling the insulating product within the pipe 4 in order to carry it from the first opening 24 to the second opening 28.

The evacuation orifice 32 may be defined by a cylindrical shape about an axis of elongation A, or axis of revolution. According to a first example of the invention, which can be seen in FIG. 3, the evacuation orifice 32 may consist of an orifice said to be straight, that is to say one with an axis of elongation A that is perpendicular to the longitudinal direction L of the pipe 4.

Figure 2:
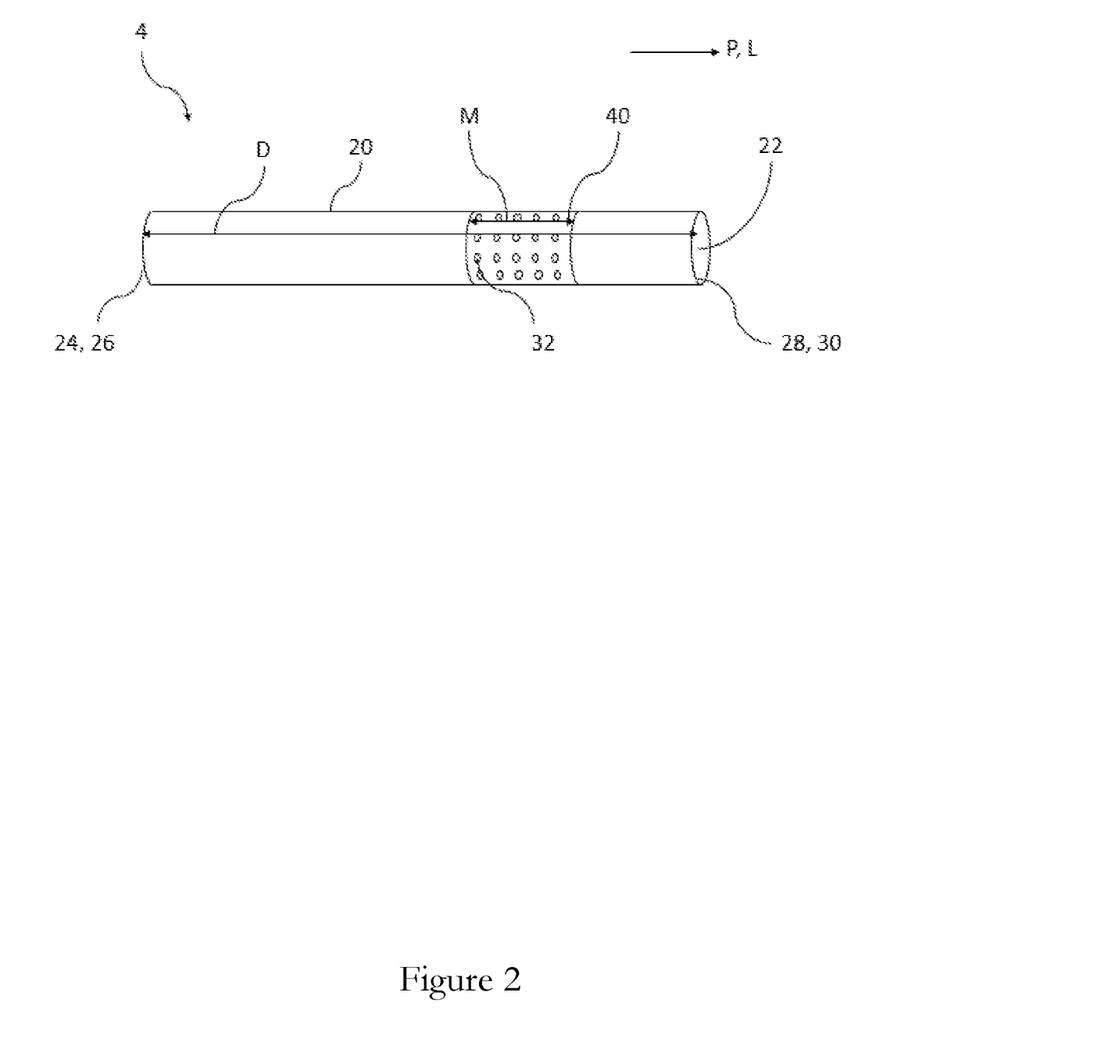
FIG. 2 is a schematic view of the pipe of the blowing machine in FIG. 1, the pipe comprising at least one evacuation orifice.
Figure 4:
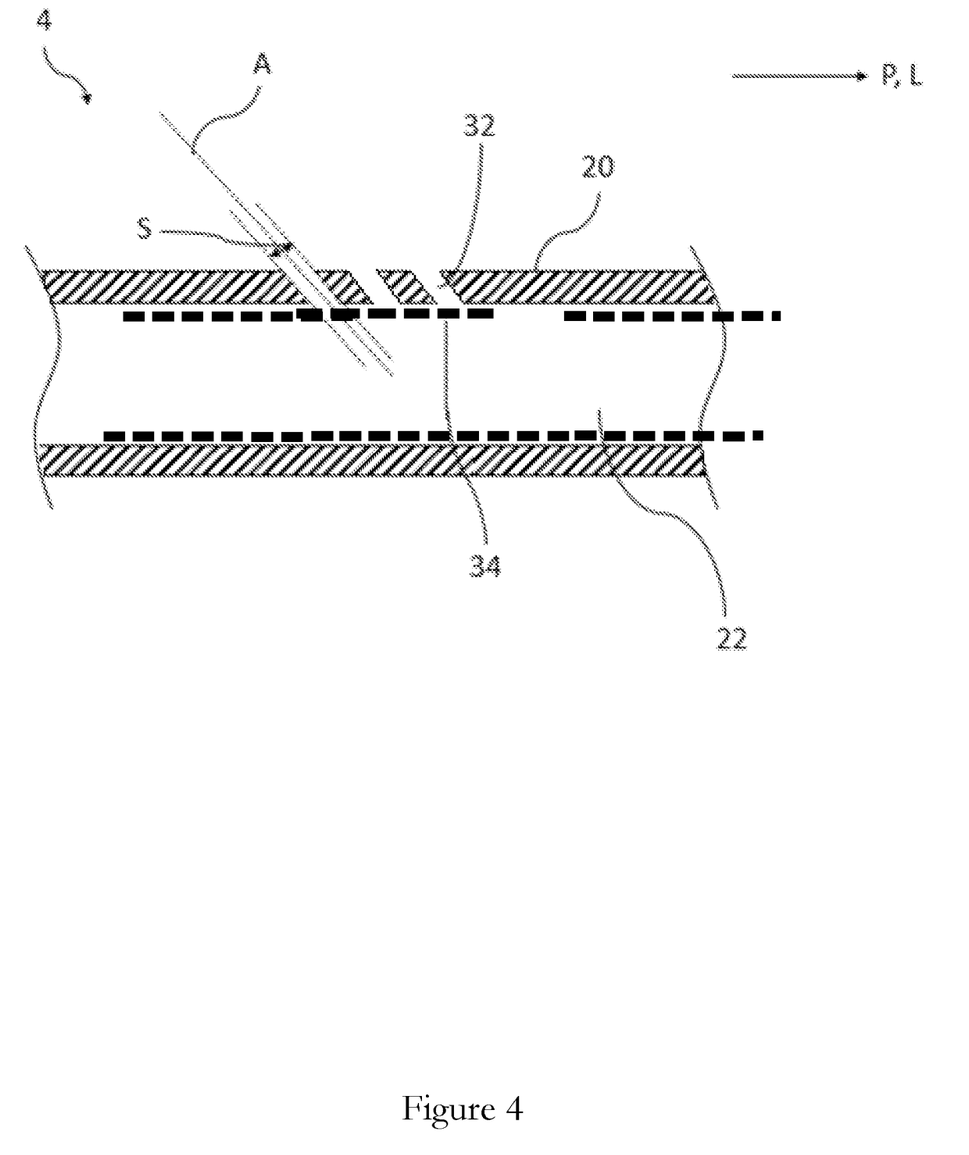
FIG. 4 is a schematic magnified view of the at least one evacuation orifice of the pipe in FIG. 2, according to a second embodiment.

According to a second example of the invention, which can be seen in FIG. 4, the evacuation orifice 32 may be inclined, meaning that it extends in the cylindrical wall 20 such that its axis of elongation A is inclined with respect to the longitudinal direction L of the pipe 4 at an angle of between 10° and 80°. Furthermore, in this example of the invention, the evacuation orifice 32 has a countercurrent inclination with respect to the flow of air and loose-fill insulating product. In other words, the evacuation orifice extends from the space 22 toward the exterior environment, that is to say from the interior to the exterior of the pipe, in the direction of the first end of the pipe 4. Benefit is taken of such a countercurrent configuration in that it makes it possible to limit the clogging of the evacuation orifice 32 by the loose-fill insulating product while it circulates in the space 22 of the pipe 4, said insulating product circulating from the first opening 24 to the second opening 28 of the pipe 4, which can be seen in FIG. 2.

Independently of the first and of the second exemplary embodiment of the evacuation orifice 32, the latter may have a passage cross section S smaller than or equal to 5 mm. The passage cross section S of the evacuation orifice 32 is measured in a plane perpendicular to the elongation direction A of the evacuation orifice. Such dimensioning of the passage cross section S of the evacuation orifice 32 makes it possible to limit the passage of the loose-fill insulating product, a cross section and/or a diameter of which is usually around 5 mm.

A filtration device 34 may be disposed so as to cover the at least one evacuation orifice 32 in order to make it possible to limit the passage of the insulating product through the evacuation orifice 32. Such a filtration device 34 may be in the form of a grating comprising a plurality of holes 36 with a passage cross section T allowing the passage of air while blocking the passage of the loose-fill insulating product. By way of example, the passage cross section T of each of these holes 36 may be smaller than or equal to 5 mm.

The filtration device 34 is disposed against a face of the cylindrical wall 20, at least partially covering the evacuation orifice 32. To this end, the filtration device 34 is made from a flexible material, making it possible to give the filtration device a partially cylindrical shape with a curvature identical to that of the cylindrical wall.

It should be noted that the filtration device 34 may be disposed in the space 22 of the pipe 4 in combination with an evacuation orifice 32, the passage cross section S of which is smaller than or equal to 5 mm, such a combination enhancing the effect limiting the passage of the insulating product through said evacuation orifice 32.

Figure 3:
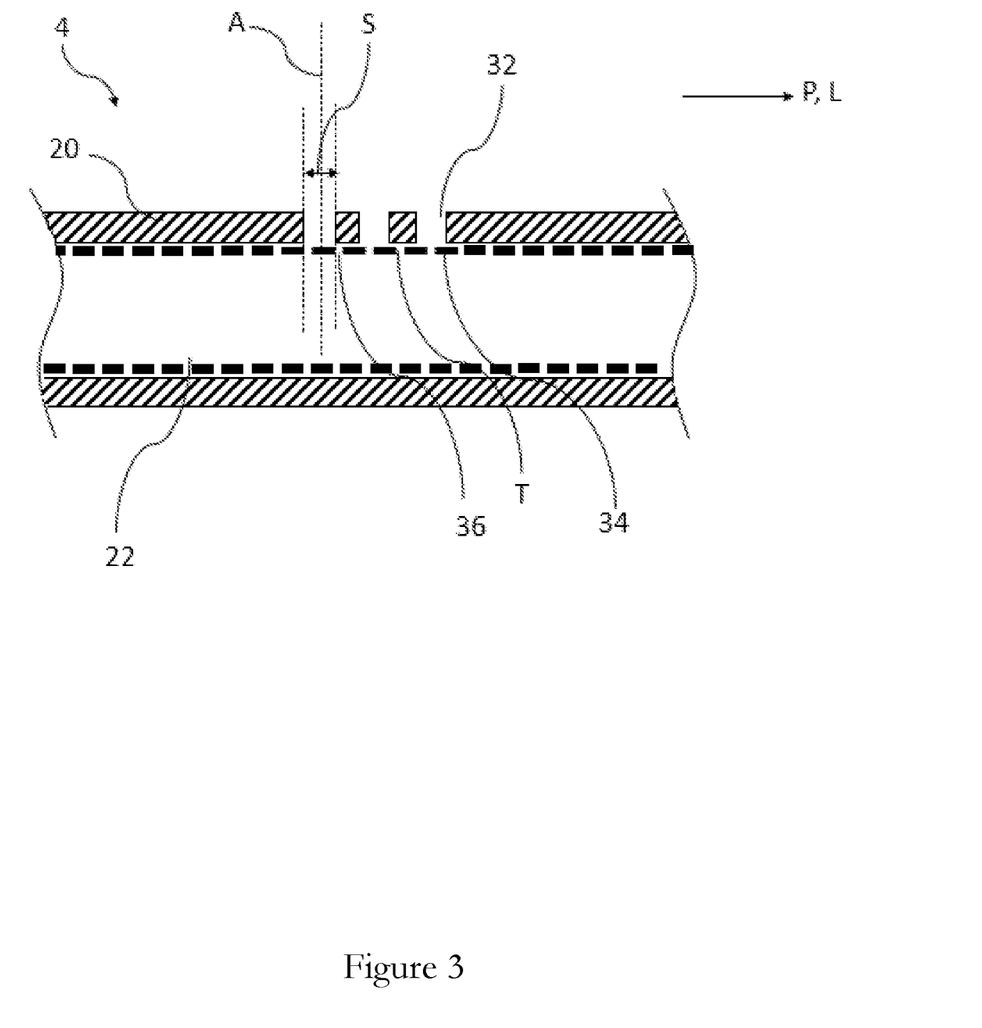
FIG. 3 is a schematic magnified view of the at least one evacuation orifice of the pipe in FIG. 2, according to a first embodiment.

As can be seen in particular in FIG. 3, the filtration device is disposed in the space 22, within the cylindrical wall 20 defining the pipe 4. Such positioning of the filtration device, against the internal face of the cylindrical wall, makes it possible in particular not to form a protuberance on the external face of the cylindrical wall of the pipe, on the exterior of the latter, and therefore not to block the movement in translation of a shutoff device 38.

As can be seen in FIGS. 3 and 4, the filtration device 34 can be disposed in the space 22 all along the cylindrical wall 20 of the pipe 4, that is to say along more or less the entire longitudinal dimension between the first opening 24 formed at the first end 26 of the pipe 4 and the second opening 28 formed at the second end 30 of the pipe 4, so as to form a cylindrical sleeve in the space 22 of said pipe 4. Such dimensioning of the filtration device 34 makes it possible to ensure that each of the evacuation orifices is covered properly and makes it easier to position and keep the filtration device 34 in the space 22 of the pipe 4. More particularly, the filtration device extends all along the internal face of this cylindrical wall 20.

Furthermore, a spacing may be provided between the cylindrical wall 20 and the filtration device 34 such that these are not in contact with one another. According to a nonlimiting example of the invention, the spacing may have a dimension, measured perpendicularly to the internal face of the cylindrical wall, of between 2 mm and 4 mm.

Figure 5:
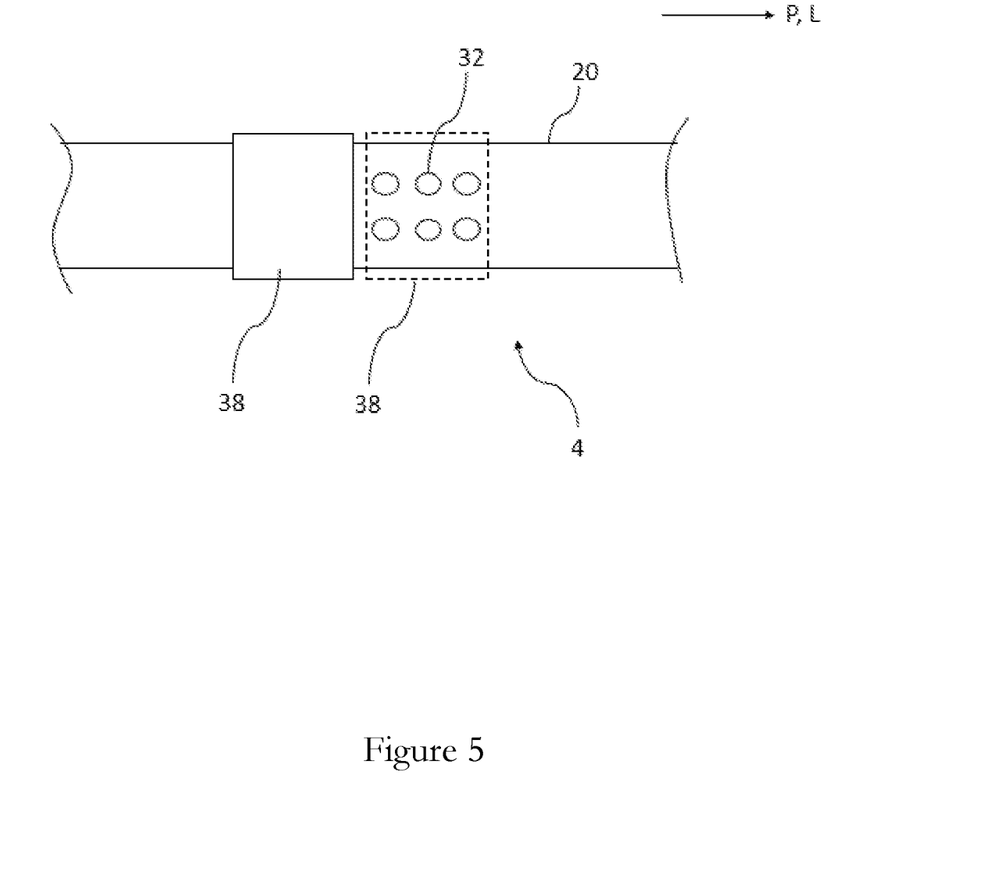
FIG. 5 is a schematic magnified view of a shutoff device of the at least one evacuation orifice of the pipe of the blowing machine according to the invention.

The shutoff device 38 of the at least one evacuation orifice 32 may, according to a nonlimiting example of the invention that can be seen in FIG. 5, be in the form of a sleeve 38 that is able to slide along the pipe 4. More specifically, the shutoff device 38 is movable in longitudinal translation L along the pipe 4 between a first, clearing position, which is indicated by solid lines in FIG. 5 and which is such that the evacuation orifices are not covered by the shutoff device and can allow the air to pass to the exterior of the pipe, and a second, covering position, which is indicated by broken lines in FIG. 5 and which is such that all of the evacuation orifices are covered and air cannot exit the pipe other than through the second end, with the loose-fill insulating product. It will be understood that the shutoff device 38 has the function of externally closing off the evacuation orifice 32 in order to block the passage of the air through the latter. The movement in translation of the shutoff device 38 may in particular be controlled manually by a user of the blowing machine 1, or via an electronic remote-controller, which is not shown. If necessary, the shutoff device may take up an intermediate position, between the clearing position and the covering position, in which only a part of the evacuation orifices is cleared. It is thus possible to control the quantity of air intended to exit the pipe upstream of the second end and therefore to vary the flow rate of air exiting the pipe without otherwise changing the flow rate of air at the inlet of the blowing machine.

According to one feature of the invention, the evacuation orifice 32 is formed in the cylindrical wall 20 of the pipe 4 such that it is closer to the second end 30 of the pipe 4 than to the first end 26. In other words, the evacuation orifice 32 is closer to the outlet of the mixture of air and loose-fill insulating product from the pipe 4 than to the inlet thereof into said pipe 4, in order that the pressure and the circulation flow rate in the space 22 of the pipe 4 remain sufficient to carry the mixture from the first opening 24 at least as far as the second opening 28 of the pipe 4. This allows effective evacuation of a part of the air circulating in the space 22 of the pipe 4 while maintaining a sufficient spray of the mixture exiting the pipe 4.

It should be borne in mind that the structural and functional features of the evacuation orifice 32 apply, mutatis mutandis, to a plurality of evacuation orifices 32. More specifically, the pipe 4 may comprise the plurality of evacuation orifices 32 formed in its cylindrical wall 20, said evacuation orifices 32 being grouped together in a section 40 of the pipe 4, which can be seen in FIG. 2. More particularly, the evacuation orifices 32 are grouped together in the section 40 of the pipe 4 that is able to be shut off completely or partially by the shutoff device 38 described above in relation to FIG. 5. Each of the evacuation orifices 32 may have a passage cross section S smaller than or equal to 5 mm and/or each of said evacuation orifices 32 is covered by the above-described filtration device. Thus, an elongation dimension M of the section 40 comprising the plurality of evacuation orifices 32 is defined, measured along the longitudinal direction L of the pipe 4, and the section 40 is arranged such that its elongation dimension M is strictly less than half the dimension D of the pipe 4 as defined above. It will be understood in particular that such a feature makes it possible to concentrate the evacuation of the air out of the space 22 of the pipe 4 in the section 40 located at the second end 30 of the pipe 4, in order to maintain a sufficient flow rate and pressure of the air from the first opening 24 of the pipe 4, necessary for effective spraying of the mixture of air and insulating product in the zone to be insulated of the dwelling.

Figure 6:
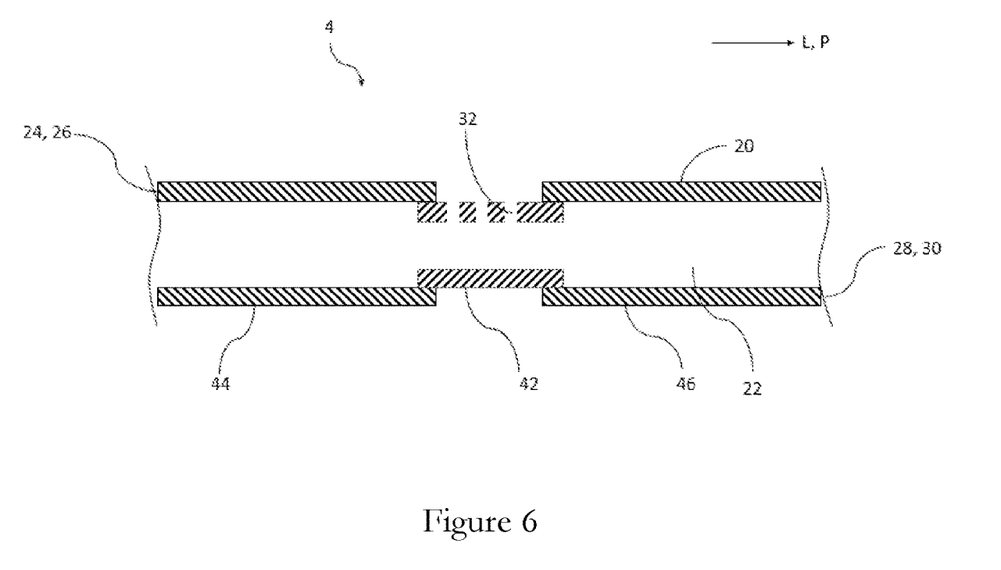
FIG. 6 is a schematic magnified view of a module comprising the at least one evacuation orifice, fitted between a first part of a cylindrical wall of the pipe and a second part of the cylindrical wall of the pipe.

According to another embodiment of the invention, which can be seen in FIG. 6, the at least one evacuation orifice 32 may be located on a module 42 separate from the cylindrical wall 20 of the tube 4. More specifically, a cylindrical module 42 comprising the at least one evacuation orifice 32 may be disposed between a first part 44 of the cylindrical wall 20 comprising the first opening 24 and a second part 46 of the cylindrical wall 20 comprising the second opening 28. It will thus be understood that the first part 44 of the cylindrical wall 20, the module 42 and the second part 46 of the cylindrical wall 20 help to form the space 22 of the pipe 4. It will furthermore be understood that the joint between the module 42, the first part 44 of the cylindrical wall 20 and the second part 46 of the cylindrical wall 20 is sealed so as to allow the passage of the loose-fill insulating product only in the space 22 of the pipe 4, and the passage of the air only in the space 22 of the pipe 4 and the evacuation orifice 32. It should be borne in mind that the module 42 may also comprise the plurality of evacuation orifices 32 and that all of the structural and functional features of the at least one evacuation orifice 32 apply, mutatis mutandis, to at least the plurality of evacuation orifices 32 formed in the module 32.

A method for insulating a building in which a loose-fill insulating product is blown by the blowing machine 1 will now be described with reference to FIGS. 1 to 5.

The insulation method comprises a first step, during which the base 2 of the blowing machine 1 is supplied with air at the air inlet 6 and by the ventilation device 16 present in the air circulation channel 10. During this first step, the user determines an air supply flow rate which determines the flow rate of air entering the base and entering the pipe at the first end 26. During a second step of the method, the base 2 of the blowing machine 1 is supplied with loose-fill insulating product via the inlet 8 for the insulating product formed in the base 2. It should be noted that these two first steps of the method can be carried out simultaneously or in succession, in any order.

During a third step of the method, the air circulates in the air circulation channel 10 from the base 2 to the first opening 24 of the pipe 4, by the ventilation device 16. It will also be understood that, during the third step, the loose-fill insulating product passes through the circulation channel 12 for the insulating product as far as the first opening 24 of the pipe 4. The user can be prompted to adjust the flow rate control member 18 in order to have a content of loose-fill insulating product for a given air flow rate, and therefore to make it possible to obtain, at the outlet of the blowing machine, more or less compact insulation.

In a fourth step, the mixture formed by the air and the loose-fill insulating product is sprayed in the space 22 of the pipe 4 by the air circulating at a high flow rate and pressurized by the ventilation device 16. The loose-fill insulating product is thus transported from the first opening 24 of the pipe 4 to its second opening 28 in order to be sprayed in a zone of the building to be insulated. It will be understood that, during the fourth step of the method, the evacuation orifice 32 makes it possible to evacuate a part of the air circulating in the space 22 out of the pipe 4 in order to limit the flow rate of the mixture exiting the pipe through the second opening 28, allowing the user to better control the distribution of the insulating product in the zone to be insulated of the dwelling.

During this fourth step, the user, who directs the pipe in the direction of the zone to be insulated, can cover the evacuation orifices, and in this case completely or partially, in order to periodically reduce the flow rate of air exiting the blowing machine and therefore the power at which the loose-fill insulating product is sprayed. The user can thus modify the operation of the blowing machine without otherwise needing to change the flow rate of air at the inlet of the blowing machine.

As has just been described, both through the description of the blowing machine and through the description of the use method, the invention makes it possible, by way of simple means, to provide an operation of blowing loose-fill insulating product that can be adapted to confined environments in which the loose-fill insulating product is intended to be deposited while avoiding raising too much dust during spraying and/or can provide insulation in which the loose-fill insulating product is not excessively compacted under the effect of too high an air pressure.

The invention as has just been described is not, however, limited to the devices, systems and configurations exclusively described and illustrated, but also applies to any equivalent devices, systems or configurations and to any combination of such devices, systems or configurations.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be appreciated that the various embodiments described previously are combinable according to any technically permissible combinations.

The invention claimed is:

1. A machine for blowing a loose-fill insulating product, comprising at least a base and a pipe for transporting the insulating product, the base comprising at least an air inlet, an inlet for loose-fill insulating product and an outlet connected to the pipe, the pipe comprising at least one cylindrical wall configured for a passage of the loose-fill insulating product between a first opening formed at a first end of the pipe, secured to the outlet of the base, and a second opening formed at a second end of the pipe, at an opposite end from its first end along a longitudinal main elongation direction of the pipe, the blowing machine having at least one evacuation orifice, separate from the first opening and the second opening, formed through the cylindrical wall of the pipe, the at least one evacuation orifice being configured to allow passage of air toward an exterior of the pipe and block the passage of the loose-fill insulating product, wherein the pipe comprises at least one shutoff device for the at least one evacuation orifice, the shutoff device being movable along the longitudinal direction of the pipe.

2. The blowing machine as claimed in claim 1, wherein the evacuation orifice has a passage cross section smaller than or equal to 5 mm.

3. The blowing machine as claimed in claim 1, further comprising a filtration device disposed so as to cover the at least one evacuation orifice.

4. The blowing machine as claimed in claim 3, wherein the filtration device is a grating disposed against the cylindrical wall.

5. The blowing machine as claimed in claim 3, wherein the filtration device is disposed in a space delimited within the cylindrical wall.

6. The blowing machine as claimed in claim 4, wherein the filtration device is disposed in a space delimited within the cylindrical wall.

7. The blowing machine as claimed in claim 1, wherein the at least one evacuation orifice is closer to the second end of the pipe than to the first end.

8. The blowing machine as claimed in claim 1, comprising a plurality of evacuation orifices, the evacuation orifices being grouped together in a section of the pipe that is able to be completely shut off by the shutoff device.

9. The blowing machine as claimed in claim 1, wherein the base comprises an air circulation channel and a circulation channel for the loose-fill insulating product which are respectively connected to the air inlet and to the inlet for the loose-fill insulating product, the air circulation channel and the circulation channel for the loose-fill insulating product being fluidically connected to the first opening of the pipe.

10. The blowing machine as claimed in claim 9, further comprising a member for controlling the flow rate positioned between the circulation channels and the first opening of the pipe.

11. A method for insulating a zone to be insulated, the method comprising blowing a loose-fill insulating product by a blowing machine as claimed in claim 1.

12. The insulating method as claimed in claim 11, during which the base of the blowing machine is supplied with air in a first step, via the air inlet and at a given flow rate, the air being mixed with the loose-fill insulating product during subsequent steps in order for them to circulate together in the pipe in the direction of the second opening thereof, a user being able to configure the air evacuation opening to evacuate a given quantity of air between the base and the second opening.

13. A machine for blowing a loose-fill insulating product, comprising at least a base and a pipe for transporting the insulating product, the base comprising at least an air inlet, an inlet for loose-fill insulating product and an outlet connected to the pipe, the pipe comprising at least one cylindrical wall configured for a passage of the loose-fill insulating product between a first opening formed at a first end of the pipe, secured to the outlet of the base, and a second opening formed at a second end of the pipe, at an opposite end from its first end along a longitudinal main elongation direction of the pipe, the blowing machine having at least one evacuation orifice, separate from the first opening and the second opening, formed through the cylindrical wall of the pipe, the at least one evacuation orifice being configured to allow passage of air toward an exterior of the pipe and block the passage of the loose-fill insulating product, and further comprising a filtration device disposed so as to cover the at least one evacuation orifice, wherein the filtration device is a grating disposed against the cylindrical wall.

14. A machine for blowing a loose-fill insulating product, comprising at least a base and a pipe for transporting the insulating product, the base comprising at least an air inlet, an inlet for loose-fill insulating product and an outlet connected to the pipe, the pipe comprising at least one cylindrical wall configured for a passage of the loose-fill insulating product between a first opening formed at a first end of the pipe, secured to the outlet of the base, and a second opening formed at a second end of the pipe, at an opposite end from its first end along a longitudinal main elongation direction of the pipe, the blowing machine having at least one evacuation orifice, separate from the first opening and the second opening, formed through the cylindrical wall of the pipe, the at least one evacuation orifice being configured to allow passage of air toward an exterior of the pipe and block the passage of the loose-fill insulating product, and further comprising a filtration device disposed so as to cover the at least one evacuation orifice, wherein the filtration device is disposed in a space delimited within the cylindrical wall.

* * * * *